(12) United States Patent
Hudson et al.

(10) Patent No.: US 11,121,671 B2
(45) Date of Patent: Sep. 14, 2021

(54) A-FRAME FOUNDATION SYSTEM FOR SINGLE-AXIS TRACKERS WITH WEAK AXIS SUPPORT

(71) Applicant: Ojjo, Inc., San Rafael, CA (US)

(72) Inventors: Tyrus Hudson, Petaluma, CA (US); Kathryn Pesce, El Cerrito, CA (US); David Mar, Berkeley, CA (US); Jack West, San Rafael, CA (US)

(73) Assignee: Ojjo, Inc., San Rafael, CA (US)

( * ) Notice: Subject to any disclaimer, the term of this patent is extended or adjusted under 35 U.S.C. 154(b) by 0 days.

(21) Appl. No.: 16/439,603

(22) Filed: Jun. 12, 2019

(65) Prior Publication Data
US 2020/0076355 A1   Mar. 5, 2020

Related U.S. Application Data

(60) Provisional application No. 62/825,215, filed on Mar. 28, 2019, provisional application No. 62/821,614, filed on Mar. 21, 2019, provisional application No. 62/745,188, filed on Oct. 12, 2018, provisional application No. 62/727,456, filed on Sep. 5, 2018.

(51) Int. Cl.
*H02S 20/32* (2014.01)
*F24S 25/13* (2018.01)
*F24S 25/617* (2018.01)
*F24S 30/00* (2018.01)

(52) U.S. Cl.
CPC .............. *H02S 20/32* (2014.12); *F24S 25/13* (2018.05); *F24S 25/617* (2018.05); *F24S 2030/15* (2018.05)

(58) Field of Classification Search
CPC ...... F24S 25/13; F24S 25/617; F24S 2030/15; F24S 25/65; F24S 25/70; F24S 30/425; F24S 2025/019; H02S 20/32; Y02E 10/47; Y02E 10/50
See application file for complete search history.

(56) References Cited

U.S. PATENT DOCUMENTS

| | | | | |
|---|---|---|---|---|
| 812,344 | A * | 2/1906 | Howser | B25H 1/06 182/153 |
| 2,924,414 | A * | 2/1960 | Tesdal | F16M 11/32 248/165 |
| 3,653,658 | A * | 4/1972 | Robertson | A63B 3/00 482/42 |
| 3,966,172 | A * | 6/1976 | Garrett | E01F 7/02 256/12.5 |
| 4,457,297 | A * | 7/1984 | Sobczak | F24S 30/452 126/605 |
| 4,832,001 | A * | 5/1989 | Baer | H02S 20/30 126/579 |
| 4,921,373 | A * | 5/1990 | Coffey | E02B 3/108 256/13 |
| 4,993,635 | A * | 2/1991 | Dupre | F25C 3/04 239/14.2 |

(Continued)

*Primary Examiner* — James M Ference
(74) *Attorney, Agent, or Firm* — Phillip Mancini

(57) ABSTRACT

A single-axis tracker supported by multiple A-frame-shaped single-truss foundations that translate lateral loads into axial forces of tension and compression, and at least one truss foundation supporting the torque tube drive motor or other tracker component subject to axial loads to provide support for lateral loads as well as loads oriented along the axis of the torque tube.

7 Claims, 13 Drawing Sheets

(56) References Cited

U.S. PATENT DOCUMENTS

| | | | | |
|---|---|---|---|---|
| 5,228,924 A * | 7/1993 | Barker | F24S 30/425 | 136/246 |
| 5,655,515 A * | 8/1997 | Myles, III | F24S 20/20 | 126/601 |
| 6,563,040 B2 * | 5/2003 | Hayden | F24S 30/428 | 136/244 |
| 6,572,061 B2 * | 6/2003 | Overbeck | A47C 4/20 | 248/163.1 |
| 6,665,990 B1 * | 12/2003 | Cody | E02D 27/42 | 405/244 |
| 6,863,065 B2 * | 3/2005 | Marut | F24S 20/30 | 126/681 |
| 7,285,719 B2 * | 10/2007 | Conger | F24S 25/50 | 136/245 |
| 7,472,666 B1 * | 1/2009 | Richard | B63B 17/02 | 114/361 |
| D605,585 S * | 12/2009 | Conger | F24S 25/50 | D13/102 |
| 7,984,789 B2 * | 7/2011 | Michalec | A01M 31/02 | 182/115 |
| 8,137,052 B1 * | 3/2012 | Schlegel | F03D 1/0625 | 415/4.3 |
| 8,389,918 B2 * | 3/2013 | Oosting | F24S 50/20 | 250/203.4 |
| 8,429,861 B2 * | 4/2013 | Conger | F24S 25/50 | 52/146 |
| 8,484,906 B1 * | 7/2013 | Tarr | B63B 17/02 | 52/63 |
| 8,609,977 B2 * | 12/2013 | Jones | H02S 20/00 | 136/246 |
| 8,714,881 B2 * | 5/2014 | Gagliano | E02D 5/22 | 405/231 |
| 8,776,781 B2 * | 7/2014 | Meydbray | H02S 20/32 | 126/608 |
| 8,875,450 B2 * | 11/2014 | Conger | H01L 31/042 | 52/146 |
| 8,904,734 B2 * | 12/2014 | Lucas | H02S 20/10 | 52/741.15 |
| 8,925,260 B2 * | 1/2015 | Conger | E04C 3/30 | 52/146 |
| 8,940,997 B2 * | 1/2015 | Conger | H02S 20/10 | 136/244 |
| 9,051,034 B1 * | 6/2015 | Tarr | B63B 17/02 | |
| 9,388,547 B2 * | 7/2016 | Kellner | E02D 5/80 | |
| 9,545,063 B1 * | 1/2017 | Kastl | A01G 25/092 | |
| 10,128,791 B2 * | 11/2018 | Ludwig | F24S 25/636 | |
| 10,903,784 B2 * | 1/2021 | Hudson | H02S 20/32 | |
| 2003/0005953 A1 * | 1/2003 | Erbetta | E04H 15/36 | 135/151 |
| 2003/0070705 A1 * | 4/2003 | Hayden | F24S 25/12 | 136/251 |
| 2007/0215199 A1 * | 9/2007 | Dold | H02S 20/23 | 136/246 |
| 2007/0278224 A1 * | 12/2007 | Van Romer | B65D 90/205 | 220/9.4 |
| 2007/0278225 A1 * | 12/2007 | Van Romer | B65D 88/22 | 220/9.4 |
| 2008/0029148 A1 * | 2/2008 | Thompson | H02S 20/30 | 136/244 |
| 2008/0168981 A1 * | 7/2008 | Cummings | F24S 25/50 | 126/600 |
| 2008/0230047 A1 * | 9/2008 | Shugar | F24S 25/617 | 126/569 |
| 2009/0095283 A1 * | 4/2009 | Curtis | F24S 30/425 | 126/704 |
| 2009/0184073 A1 * | 7/2009 | Lu | A47G 25/0664 | 211/85.3 |
| 2010/0051016 A1 * | 3/2010 | Ammar | F24S 23/77 | 126/600 |
| 2010/0089389 A1 * | 4/2010 | Seery | H02S 20/10 | 126/608 |
| 2010/0139645 A1 * | 6/2010 | Whipple | H02S 20/10 | 126/576 |
| 2010/0154780 A1 * | 6/2010 | Linke | F24S 25/16 | 126/573 |
| 2010/0229851 A1 * | 9/2010 | Reynolds | F24S 23/74 | 126/605 |
| 2010/0230968 A1 * | 9/2010 | Chernyshov | F03D 5/00 | 290/44 |
| 2010/0258110 A1 * | 10/2010 | Krabbe | F24S 30/455 | 126/605 |
| 2011/0192394 A1 * | 8/2011 | Brothersen | E04C 3/09 | 126/680 |
| 2012/0006317 A1 * | 1/2012 | Sade | H02S 30/10 | 126/600 |
| 2012/0223179 A1 * | 9/2012 | Galindo Gonzalez | B65H 75/185 | 242/598.5 |
| 2013/0001395 A1 * | 1/2013 | Schmalzried | F24S 25/617 | 248/506 |
| 2013/0019916 A1 * | 1/2013 | Frank | F24S 25/10 | 136/206 |
| 2013/0048582 A1 * | 2/2013 | Kruse | F24S 30/425 | 211/41.1 |
| 2013/0087640 A1 * | 4/2013 | Pfrenger | A01G 25/092 | 239/723 |
| 2013/0192659 A1 * | 8/2013 | Upton | H01L 31/052 | 136/246 |
| 2013/0340807 A1 * | 12/2013 | Gerwing | H02S 30/20 | 136/246 |
| 2014/0374550 A1 * | 12/2014 | Straeter | F24S 25/10 | 248/156 |
| 2015/0000721 A1 * | 1/2015 | Au | F16C 23/10 | 136/246 |
| 2015/0040965 A1 * | 2/2015 | West | F24S 25/63 | 136/246 |
| 2015/0211200 A1 * | 7/2015 | Nishioka | E02D 27/12 | 405/232 |
| 2015/0236636 A1 * | 8/2015 | Sade | H02S 30/10 | 136/246 |
| 2015/0292228 A1 * | 10/2015 | Bardelli | E04H 12/2269 | 52/165 |
| 2016/0013751 A1 * | 1/2016 | Michotte De Welle | H02S 20/32 | 136/246 |
| 2016/0065116 A1 * | 3/2016 | Conger | H02S 20/32 | 136/251 |
| 2016/0251093 A1 * | 9/2016 | Hijmans | B64G 9/00 | 244/173.1 |
| 2016/0329860 A1 * | 11/2016 | Kalus | H02S 20/10 | |
| 2016/0344330 A1 * | 11/2016 | Gillis | H02S 10/40 | |
| 2016/0365830 A1 * | 12/2016 | Bailey | H02S 20/32 | |
| 2017/0104441 A1 * | 4/2017 | Swan | F24S 25/70 | |
| 2017/0353146 A1 * | 12/2017 | Praca | F16C 11/0609 | |
| 2018/0051915 A1 * | 2/2018 | Rainer | F24S 25/10 | |
| 2019/0372514 A1 * | 12/2019 | Almy | F16M 11/10 | |
| 2020/0076354 A1 * | 3/2020 | West | F24S 25/617 | |
| 2020/0076355 A1 * | 3/2020 | Hudson | F24S 25/13 | |

\* cited by examiner

A-FRAME FOUNDATION SYSTEM FOR SINGLE-AXIS TRACKERS WITH WEAK AXIS SUPPORT

CROSS REFERENCE TO RELATED APPLICATIONS

This claims priority to U.S. Provisional Patent Application No. 62/727,456, titled, "Foundation piers for axial solar arrays and related systems and methods," filed on Sep. 5, 2018, U.S. Provisional Patent Application No. 62/745,188, titled, "Optimized A-frame foundations for axial solar arrays and related systems and methods," filed on Oct. 12, 2018, U.S. Provisional Patent Application No. 62/821,614, titled "A-frame foundations for tracker motor piles and related systems and methods," filed on Mar. 21, 2019, and U.S. Provisional Patent Application No. 62/825,215, titled "Single-axis tracker supported by A-frame foundations with weak-axis support," filed on Mar. 28, 2019, the disclosures of which are hereby incorporated by reference in their entirety.

BACKGROUND

Until recently, single-axis solar trackers have been built predominately on monopile foundations. Monopiles consist of individual beams beaten into the ground with a pile driver at regular intervals along an intended North-South axis of the tracker torque tube. The monopile paradigm requires that each beam be over-specified in terms of strength, weight and depth of embedment to not only support the weight of the tracker system (torque tube, panels, motors and mounting hardware) but also to withstand bending moments introduced by wind striking the array. Because single structural members are relatively poor at resisting bending, much larger beams must be used than that required to support weight alone. Therefore, monopiles are inherently wasteful relative to foundation systems that don't need to resist bending.

To address this inefficiency, the applicant and inventors of this disclosure have proposed a truss foundation system that uses an A-frame-shaped truss foundation to support single-axis trackers. The system is known commercially as EARTH TRUSS. A-frames are advantageous in this application because they translate lateral loads caused by wind striking the array into axial forces of tension and compression rather than putting the foundation components into bending. Since single structural members are relatively good at resisting axial forces, smaller foundation components may be used to support single-axis trackers, relative to monopiles.

The EARTH TRUSS foundation is constructed by driving a pair of adjacent screw anchors into the ground so that they are angled towards one another. This may be done, for example, with a rotary driver or screw driving machine. The machine may be a purpose-built device or an attachment to an excavator or other piece of general-purpose heavy equipment. Once the pair of adjacent screw anchors is driven to their target depth, upper legs are joined to each, and an adapter, bearing adapter or other assembly connects the free ends of each upper leg to complete the truss and to provide support for tracker components (e.g., bearing assembly, drive motors, etc.).

The EARTH TRUSS is not the first A-frame-based foundation system for single-axis trackers. For example, published U.S. Patent Application no. 2016/0013751 discloses a single-axis tracker supported by a series of above-ground A-frames spaced along the torque tube. Vertical anchors support the A-frame legs below ground. Similarly, published U.S. Patent Application no. 2018/0051915 discloses a single-axis tracker that uses pairs of adjacent ground screws joined by a bridge member that in turn supports the torque tube bearing assembly. Finally, issued U.S. Pat. No. 9,207,000 discloses a single-axis tracker supported by multiple A-frames made of offset legs and bearing assemblies. Each of these prior art foundation systems will, to varying degrees, translate lateral loads into axial forces of tension and compression in the A-frame legs. Factors such as the angle between the legs, the orientation of the legs with respect to the torque tube, and the position of the rotational axis of the tracker relative to the work point of the A-frame will all affect how well lateral loads are translated as pure tension and compression (e.g., without introducing bending moments) as well as the magnitude of those forces for a given lateral load. However, because each prior art system relies solely on single trusses oriented substantially orthogonal to the direction of torque tube, weak-axis forces, that is forces aligned along the axis of the North-South oriented torque tube, will still put each A-frame or at least the A-frames supporting the drive motor(s) or ring gear(s) into bending. In other words, these systems do not utilize the A-frame paradigm to translate North-South loads into axial forces. Rather, in these prior art systems, axial forces must be resisted with bending. Therefore, the A-frame foundations in these systems will either fail in response to such loads or must be overbuilt to handle them, undermining the goal of reducing steel. If every A-frame must be built sturdy enough to resist bending, the value proposition of the A-frame relative to H-piles is eliminated. In recognition of this problem, various embodiments of the invention provide single-axis trackers and A-frame-shaped truss foundations for single axis trackers that provide weak-axis support so that loads oriented in the direction of the torque tube (e.g., North-South) may also be translated into axial forces of tension and compression instead of introducing bending.

DETAILED DESCRIPTION

The following description is intended to convey a thorough understanding of the embodiments described by providing a number of specific embodiments and details involving single-axis trackers with truss foundations that provide weak-axis support. It should be appreciated, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

As discussed in the Background, the inventors and applicant of this disclosure have proposed an alternative to monopile foundations that aims to significantly reduce the total amount of steel required to support single-axis trackers and other axial solar arrays. This alternative foundation system, referred to commercially as EARTHTRUSS, consists of a pair of sloped legs extending above and below ground and that are joined with an adapter, bearing assembly, or other torque tube support element to form an A-frame-shaped truss. The truss legs are substantially aligned on either side of the torque tube so that the A-frame defines a plane that is substantially perpendicular to the direction of the torque tube. In various embodiments, each pair of legs is oriented so that an imaginary line through their respective centers of mass intersects at a point in space that overlaps with the tracker's axis of rotation.

The truss architecture offers several advantages over conventional monopiles foundations. First, if properly designed, the A-frame will translate lateral loads caused by wind into axial forces of tension and compression in the legs rather than bending. The A-frame or truss directs lateral loads into the axial forces in the legs, which such forces are best resisted. Therefore, because the truss directs forces into the legs, the size and gauge of the steel used to make them smaller than an equivalent monopile. Also, without needing to resist bending, the legs do not need to be driven as deep as conventional monopiles. This saves steel but also reduces the likelihood of encountering a refusal. A refusal occurs when additional impacts of a pile driver fail to result in additional embedment of the pile. Usually, this is the result of striking rock or cementious soil and requires an expensive, labor-intensive mitigation process. The shallower piles are driven, the less likely it is that they will encounter rock or cementious soil. Notwithstanding these advantages, single trusses are vulnerable to axial loads along the axis of the torque tube.

Figure 1A:
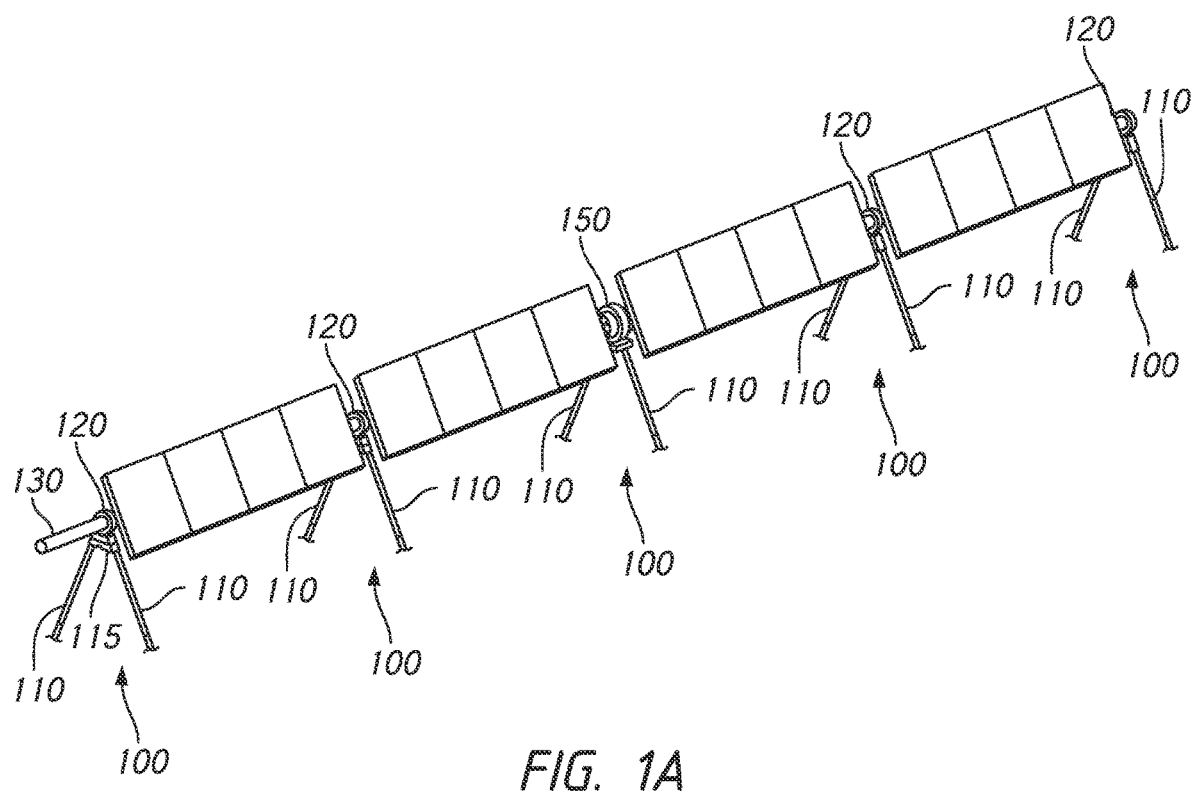
FIG. 1A is a perspective view of a single-axis tracker supported by multiple A-frame-shaped truss foundations.

Turning now to FIG. 1A, this figure shows a portion of a single-axis tracker supported by several A-frame-shaped truss foundations according to various embodiments of the invention. Each foundation 100 consists of legs 110 extending above and below ground and joined together with adapter 115. Bearing assemblies 120 sit atop each adapter 115 and torque tube 130 passes substantially orthogonally or perpendicularly through each bearing assembly, enabling it the torque tube to rotate about its own axis. Solar panels 140 are attached to torque tube 130 via mounting brackets (not shown). This exemplary tracker is a bottom-up design where the torque tube is supported from below by a bearing assembly that rests on the adapter and rotates about its own axis. Other tracker systems employ a top-down design where the torque tube hangs from a bearing pin received in a bearing assembly so that the torque tube can sweep through an arc like a pendulum. In such systems, the drive motor is offset from the torque tube's main axis so that the tracker's axis of rotation is about the bearing pin. One such top-down tracker system is disclosed, for example, in U.S. Pat. No. 10,222,446, which is hereby incorporated by reference in its entirety. The various embodiments of the invention are compatible with bottom-up as well as top-down or off-set single-axis trackers.

As noted herein, A-frame-shaped single-truss foundations are particularly well-suited for single-axis trackers. When wind strikes a single-axis tracker array, the panels provide a large amount of surface area that results in a lateral (East or West oriented) load that is translated into the foundation at the interface between the rotating and non-rotating parts (e.g., the bearing). With monopiles, this force puts the foundation in bending. With A-frame shaped truss, lateral loads are translated into axial forces of tension and compression in the truss legs. Wind generates very little force in the North-South direction because there is relatively scant surface area in the axial or North-South direction of the tracker regardless of the tracker's orientation.

Notwithstanding this fact, there are other sources of axial or so-called weak-axis (i.e., North-South) loads. For example, the slope of the underlying land may create loads along the torque tube. If the tube generally follows grade but the truss legs remain perpendicular to the tube, they will be angled off of plumb to match grade. This will create a weight component that along the axis of the torque tube proportional to the slope of the tube. Also, if the array is constructed in an area prone to seismic activity, the array will be subject to omnidirectional forces, some of which will be in the weak axis direction (i.e., along the torque tube). To compensate for this, the truss legs and interconnections must be reinforced with heavier and/or thicker materials and driven deeper into the ground to prevent failure.

Returning to the single-axis tracker of FIG. 1A, the tracker is supported by several A-framed-shaped truss foundations 100 installed along a North-South row. The legs of each truss are driven at angles to one another so that they are substantially aligned on either side of the torque tube. In various embodiments, they may be angled symmetrically (e.g., ±60-degrees) with respect to horizontal. In other cases, they may be at somewhat different angles due to variations in grade and terrain and misalignment during driving. In various embodiments, truss legs 110 may consist of single structural members or multiple interconnected structural members extending along a substantially common axis.

Figure 1B:
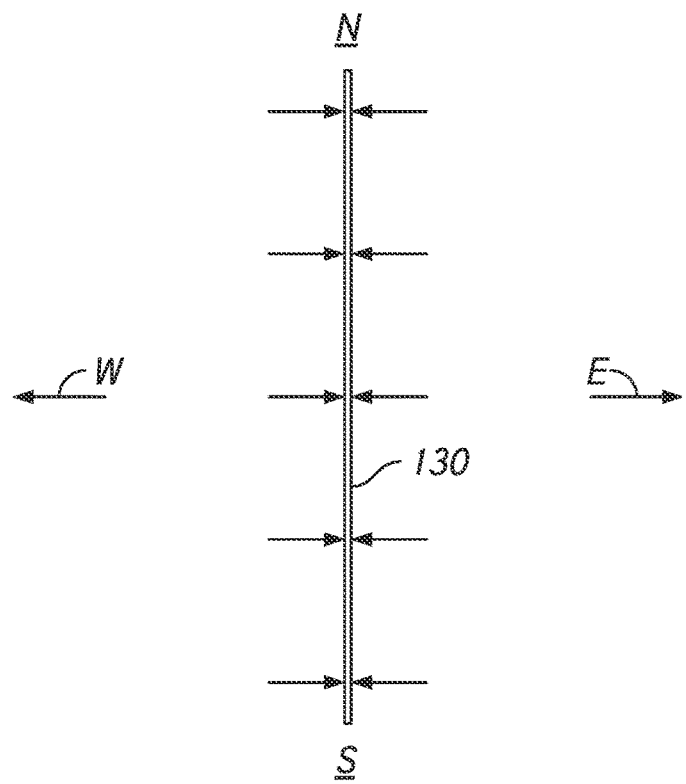
FIG. 1B is plan view force diagram showing lateral loads impingent on a single-axis tracker torque tube.
Figure 1C:
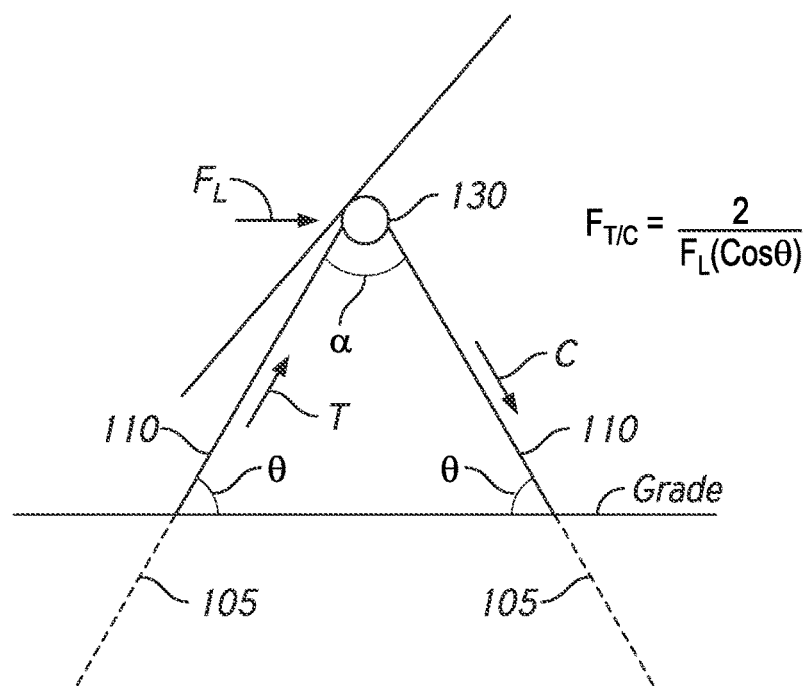
FIG. 1C is an end view force diagram showing how lateral loads are translated into axial forces of tension and compression in a single-axis tracker supported by A-frame-shaped truss foundations.

FIGS. 1B and 1C are force diagrams showing how lateral loads are translated into the legs in a single-truss foundation system. 1B is a plan view showing torque tube 130 oriented along a North-South line. Solar panels (no shown) are attached to the torque tube so that as the tube rotates, they travel from an East-facing to a West-facing orientation to follow the sun Westerly progression. As wind strikes the panels, in particular at the beginning and end of each day when they are most steeply angled, lateral loads are generated. These lateral loads are shown as the East and West-facing arrows in 1B pointing at torque tube 130.

As discussed herein, due to the relatively small cross section of the tracker in the North-South directions, axial loads (e.g., along the main axis of the torque tube) are insignificant. FIG. 1C is a force diagram looking at one end of tube 130. The impinging lateral load is labeled at $F_L$. This force is translated into the foundation via the torque tube's bearing assembly, where the rotating portions contacts the bearing, and will tend to pull up on the windward leg and to compress the leeward one. The magnitude of the tensile and compressive forces resulting from $F_L$ will be dictated by, among other things, the angle α between the legs (or angle θ of the legs with respect to horizontal). Whether or not any bending moment is introduced will depend on, among other factors, how close the rotational axis of the torque tube is to the work point of truss (i.e., the intersection point of an imaginary line through the center of mass of each leg), and whether or not the bearings have a stop to limit the extent of rotation. As the apex angle α decreases, or the leg angle θ increases, these axial forces will grow exponentially because they are proportional to $1/\cos(\theta)$ and as θ approaches 90-degrees, the $1/\cos(\theta)$ converges towards infinity.

Figure 2A:
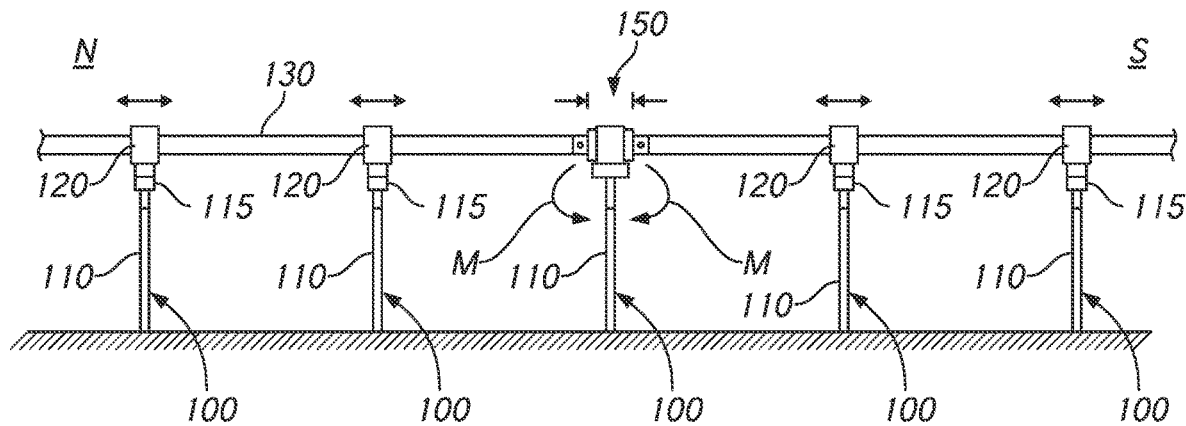
FIG. 2A is a side view of a single-axis tracker showing the extent of axial movement of the torque tube.
Figure 2B:
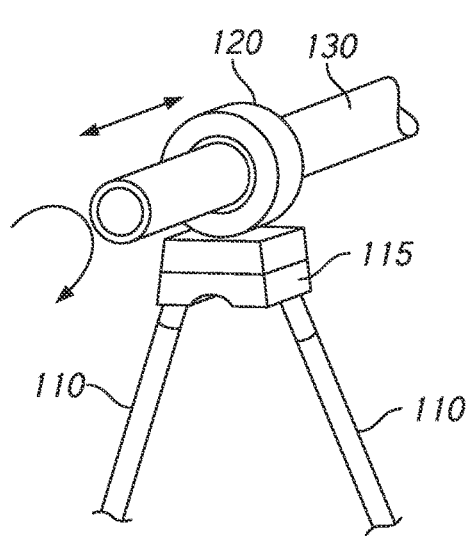
FIG. 2B is a perspective view of a bearing assembly supported by a single-truss foundation.
Figure 2C:
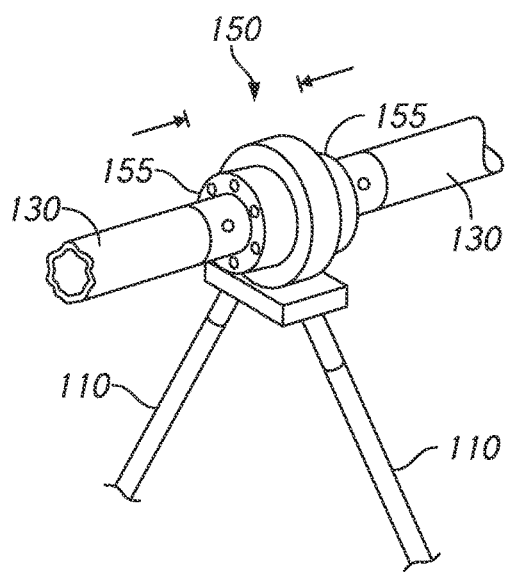
FIG. 2C is a perspective view of a torque tube drive motor supported by a single-truss foundation.

FIGS. 2A-C show the same single-axis tracker as 1A-C but with a focus on axial forces rather than lateral loads. Starting with 2A, this figures shows the single-axis tracker of 1A from the side, looking East. Torque tube 130 extends from North to South and is supported by multiple single-truss foundations 100. The arrows above tube 130 and the detail of 2B show that for the foundations that support bearing housings, the torque tube is typically able to slide within the bearing in the axial direction (North and South). One reason for this is to allow the tube to lengthen and contract in response to thermal conditions. Locking the torque tube to a single axial position would introduce strain as the tube undergoes thermal expansion and contraction and will also potentially introduce a moment in both the lateral and axial directions. The applicant and inventors of this disclosure have discovered that in trackers that allow axial movement within the bearing, axial forces can be resisted in the truss supporting torque tube drive motor alone.

It should be appreciated that some commercially available single-axis trackers do not allow the torque tube to move axially at each bearing. For example, some may use one or more set screws to limit the extent of axial movement. Others, such as the offset tracker from NEXTRACKER that suspends the torque tube from a bearing pin at each bearing assembly, also limit axial movement to the extent of the pin. Still further systems do not use a torque tube per se, but rather mount panels on rails spanning the North-South row, with hinged cross member at each foundation. For example, SUNFOLDING of San Francisco, Calif. makes a single-axis tracker called the T29 that uses a compressed air to actuate a bellows at each foundation to move the panels up and down. As another example, RBI SOLAR of Cincinnati, Ohio makes a single-axis tracker called SUNFLOWER that relies on twin purlins and a gearbox on each foundation that rotates the purlin structure about a hinged connection to the foundation. As discussed in greater detail herein, such trackers may benefit from weak-axis support at other locations such as at each foundation or some fraction of the total foundations in each row.

With continued reference to FIGS. 2A-C, in trackers such as that shown in 2A, interconnected torque tube sections making up the tube typically end on either side of the drive motor. Drive motor assembly 150 shown in 2C includes collars 155 on either side that receive or are received into the end of each adjacent torque tube section 130. In various embodiments, motor 150 turns collars 155 which are axially coupled to respective torque tube sections to rotate the tube. Because torque tube 130 ends on either side of motor 150, axial forces cannot pass through the motor and are therefore translated into the foundation at that point.

Figure 2D:
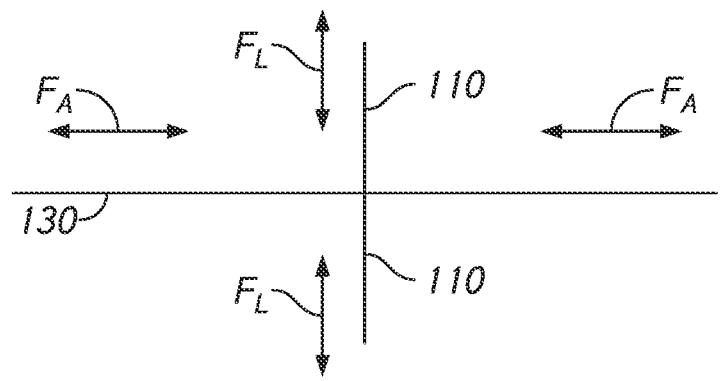
FIG. 2D is a plan view force diagram showing axial and lateral forces on a single-axis tracker supported by a single-truss foundations.

If motor 150 is supported by a conventional single-truss foundation, such as that shown in 1A, 2A and 2C, axial forces will attempt to bend legs 110 supporting motor 150 because the legs 110 are substantially orthogonal to torque tube 130, and therefore orthogonal to the direction of the force. A single truss oriented orthogonally to the torque tube cannot resist axial forces with anything other than bending. This is seen in the plan view force diagram of FIG. 2D. In this configuration of truss legs to torque tube, lateral loads, labeled $F_L$ may be translated into truss legs 110 as tension and compression, however, axial loads cannot. Regardless of leg angle, legs 110 are substantially orthogonal to the torque tube and therefore axial force $F_A$ can only result in bending. To deal with this, the single truss foundation resisting axial forces must be larger, heavier, stronger, and/or more deeply driven. Essentially this requires using an over-sized H-pile-like member for truss legs resisting axial forces. At best, this increases costs and necessitates additional SKUs for these components; at worst, it requires a different machine and driving process than that used for the other truss legs supporting the bearing assemblies.

Figure 3A:
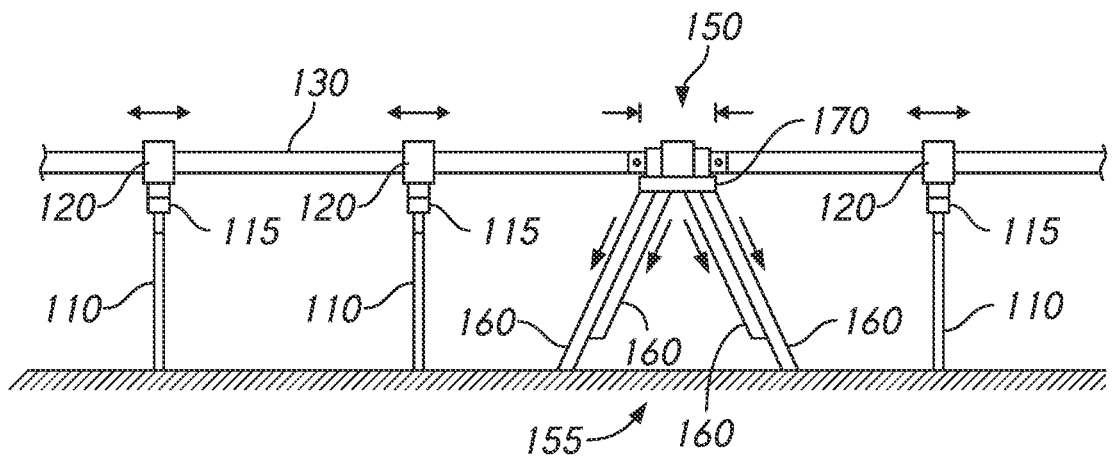
FIG. 3A is a side view of a single-axis tracker with a double-truss foundation according to various embodiments of the invention.
Figure 3B:
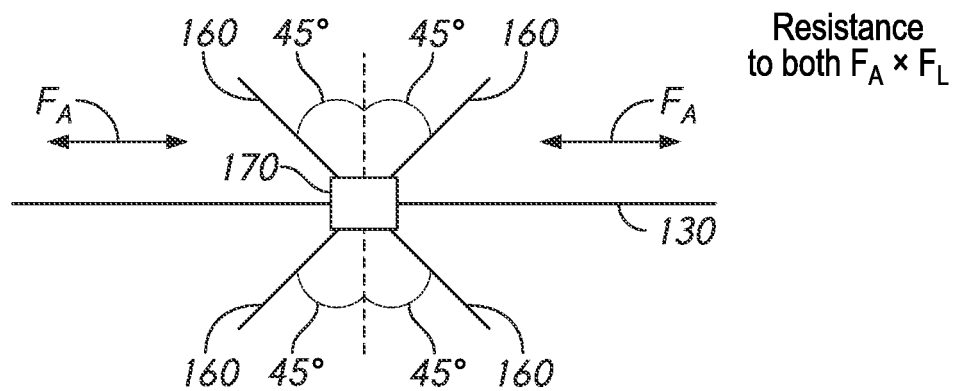
FIG. 3B is a plan view force diagram showing axial lateral forces on single-axis tracker supported by a double-truss foundation according to various embodiments of the invention.

In order to address this problem without requiring heavy piles at these locations, the applicant and inventors of this disclosure have proposed a truss configuration that enables lateral loads as well as axial loads to be translated into tension and compression in the truss legs with far less, and ideally, without any bending moments. One such embodiment is shown, for example, in FIG. 3A. In this system, torque tube 130 passes through bearing assemblies 120 supported by adapter 115 and truss legs 110. The exemplary foundation 155 shown here is a double truss, but as discussed and in greater detail herein, other configurations are also possible. Double truss foundation 155 is constructed of four truss legs 160 that are joined with four-way adapter 170. In various embodiments, legs 160 are oriented off perpendicular with respect to the torque tube, so that when viewing it from a plan view, such as 3 B, two of the legs extended Northernly and two Southernly on either side of the torque tube, with each generally sloped towards adapter 170. In 3B double-truss legs 160 are oriented at 45-degrees with respect to the torque tube but it should be appreciated that this is exemplary only. The ideal angle will be determined by a number of factors including the magnitude of worst-case axial loads relative to the magnitude of worst-case lateral loads. It should be appreciated that legs 160 are also angled with respect to horizontal as seen in 3A. Because legs arranged in this configuration will translate both lateral loads and axial forces into tension and compression in the legs, smaller members may be used than with a single-truss and ideally, the same legs may be used that are used to make up the single-truss foundations supporting bearing assemblies 120.

Figure 4A:
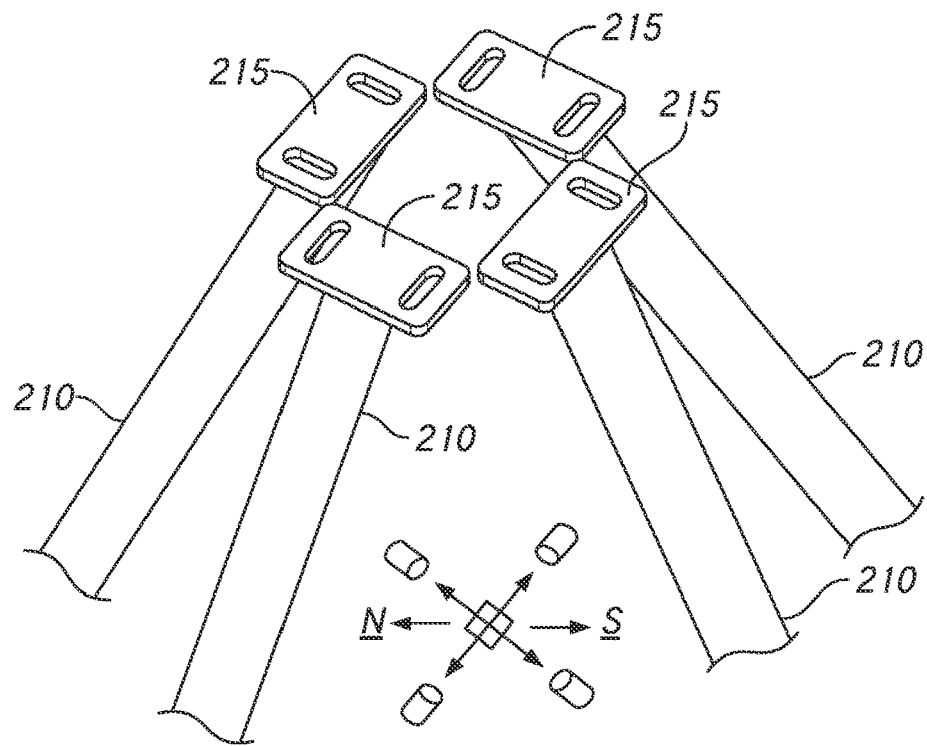
FIGS. 4A and B are two views of a double-truss foundation and adapter according to various exemplary embodiments of the invention.
Figure 4B:
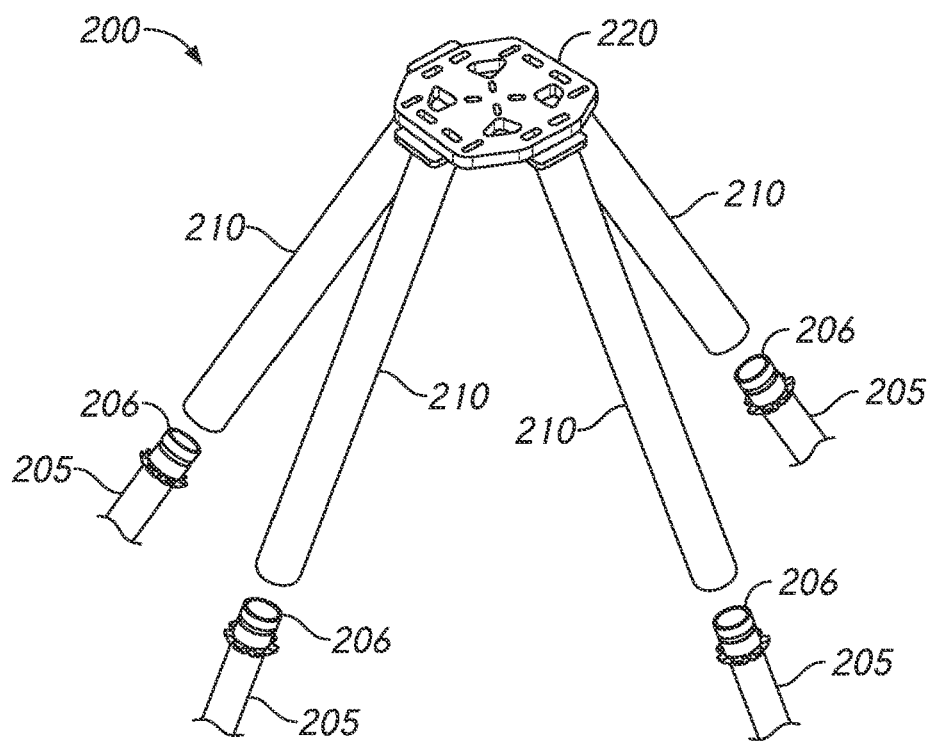

The remainder of the disclosure is directed to various truss foundation systems that providing weak axis support. Starting with FIGS. 4A and B, these figures show double truss foundation system 200 for supporting a torque tube drive motor, or in some cases, a bearing assembly or other axial load-bearing tracker component according to various embodiments of the invention. As shown, system 200 consists of four truss legs 210 joined at the top by adapter 220. In various embodiments, truss legs 210 are connected to base anchors 205 which, in turn are driven into supporting ground below the torque tube. In various embodiments, the base anchors 205 are oriented below the torque tube in a cross pattern as shown in the 4A to point towards adapter 220. The cross pattern is characterized in right angles between each leg. In other embodiments, anchors 205 may be oriented in an "X" pattern, with the torque tube passing through the legs separated by obtuse angles.

In various embodiment, coupler 206 connecting base anchor 205 to upper leg 210 allows for some degree of axial adjustment to enable upper leg 210 to be reoriented with respect to screw anchors 205 to adjust for any misalignment introduced during driving. As shown, each leg 210 has a support plate (support plate 215) attached to its top end. Support plates 215 serve as a shelf and an attachment point to join legs 210 to adapter plate 220. Couplers 206 may the orientation of legs 210 to be adjusted so that plates 215 to be adjusted to present a uniform, flat and/or level surface on which to attach plate 220. As shown, adapter plate 220 includes a plurality of through holes to enable legs 210 to be attached at various positions and angles around adapter 220. Also, though not shown, it is possible that a fifth, plumb leg could be driven at the center of the four legs outer legs and oriented to point straight up to adapter plate 220 if additional support is required, such as, for example, in loosely structured soils. It should be appreciated that double-truss foundation system 200 may be used to support the torque tube drive motor or at other places along a tracker row where axial forces impart a moment to the foundation.

Figure 5A:
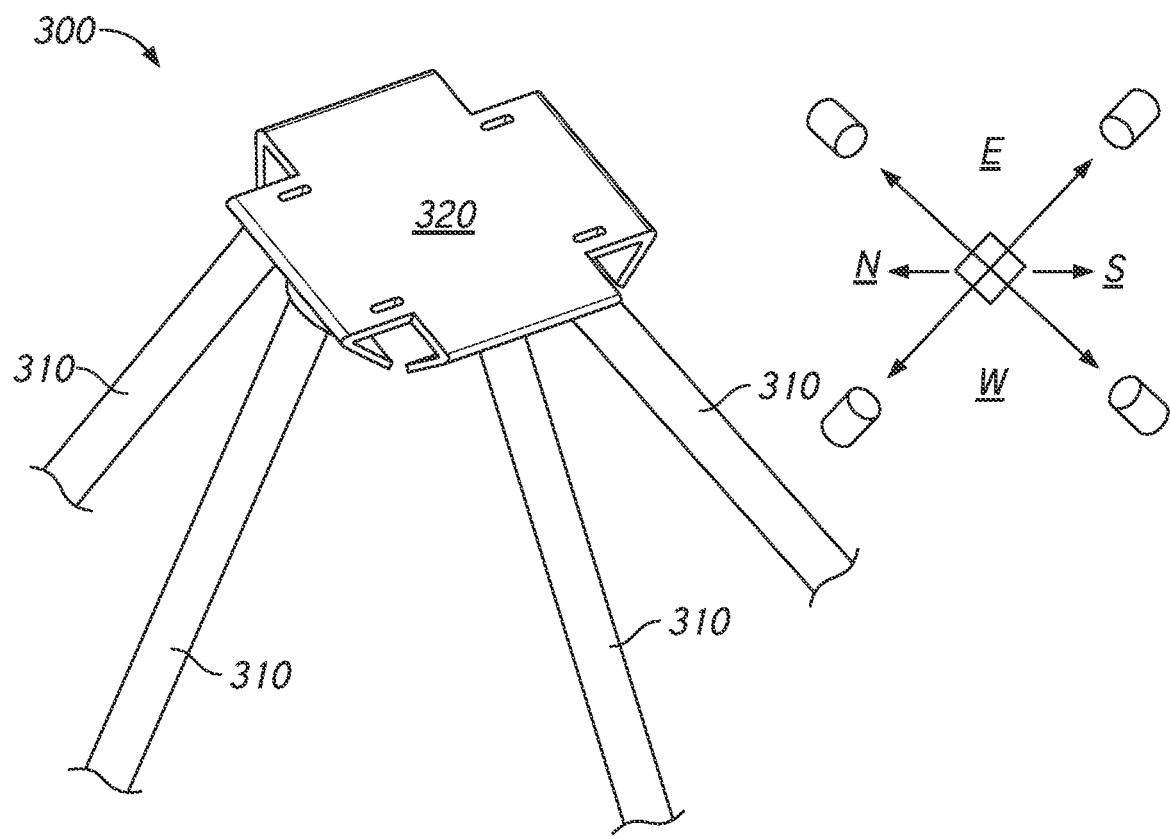
FIGS. 5A and B are two views of another double-truss foundation and adapter according to various exemplary embodiments of the invention.
Figure 5B:
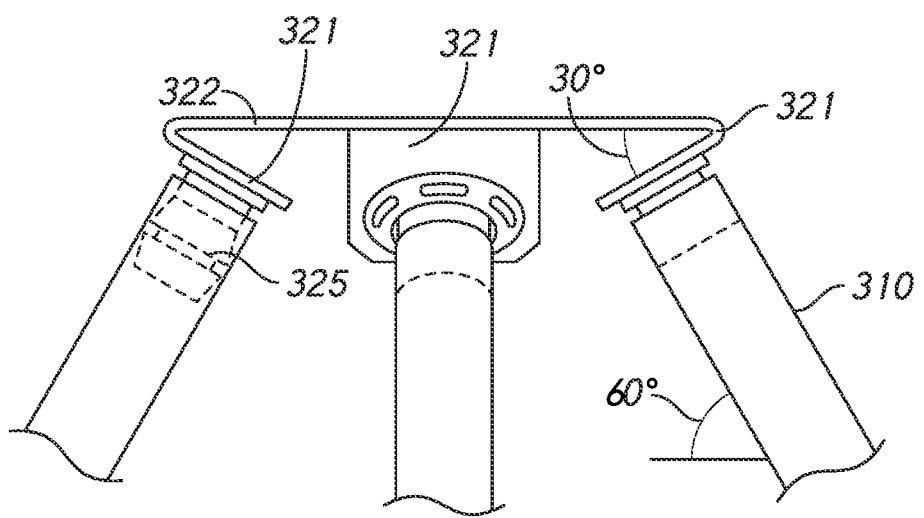

Turning to FIGS. 5A and B, these figures show another double-truss foundation system 300 for supporting a torque tube drive motor or other tracker component subject to axial loads according to yet another embodiment of the invention. System 300 uses adapter 320 made from cut and bent steel plate that may be less expensive to manufacture than the machined or cast plate shown in the embodiment of FIGS. 4A/B. Adapter 320 consists of a metal plate (e.g., ¼ inch thick) with four square corner pieces removed to create flanges 321. Flanges 321 are bent downward along the four sides of adapter 320. The resultant adapter provides a flat upper mounting surface and four angled lower surfaces to connect to the truss legs. Each flange 321 is oriented at the desired angle (e.g. 30-degrees) to be orthogonal to its corresponding leg. So, for example, if legs 310 are oriented at 60-degrees with respect to horizontal, each flange will be bent to be at 30-degrees with respect to horizontal. In various embodiments, couplers 325 are pre-welded to each flange 321 at the location to receive one of legs 310. Couplers 325 are similar to couplers 206 attached to the head of base screw anchors 205 in 4B but without the toothed ring that is used for driving the base screw anchors in the ground. Like coupler 206, couplers 325 do include a pair of opposing tapered surfaces separate by a gap to enable additional axial adjustment between couplers 325 and legs 310 and subsequent crimping of the outer surface of leg 310 to lock the leg to the desired axial orientation. In various embodiments, legs 310 are attached to respective base anchors (not shown) in a manner consistent with that discussed herein prior to attaching adapter 320. Base anchors may be driven into supporting ground in the cross-shaped pattern shown in 5A, and X-shaped pattern, or other suitable substantially symmetric pattern.

Figure 6A:
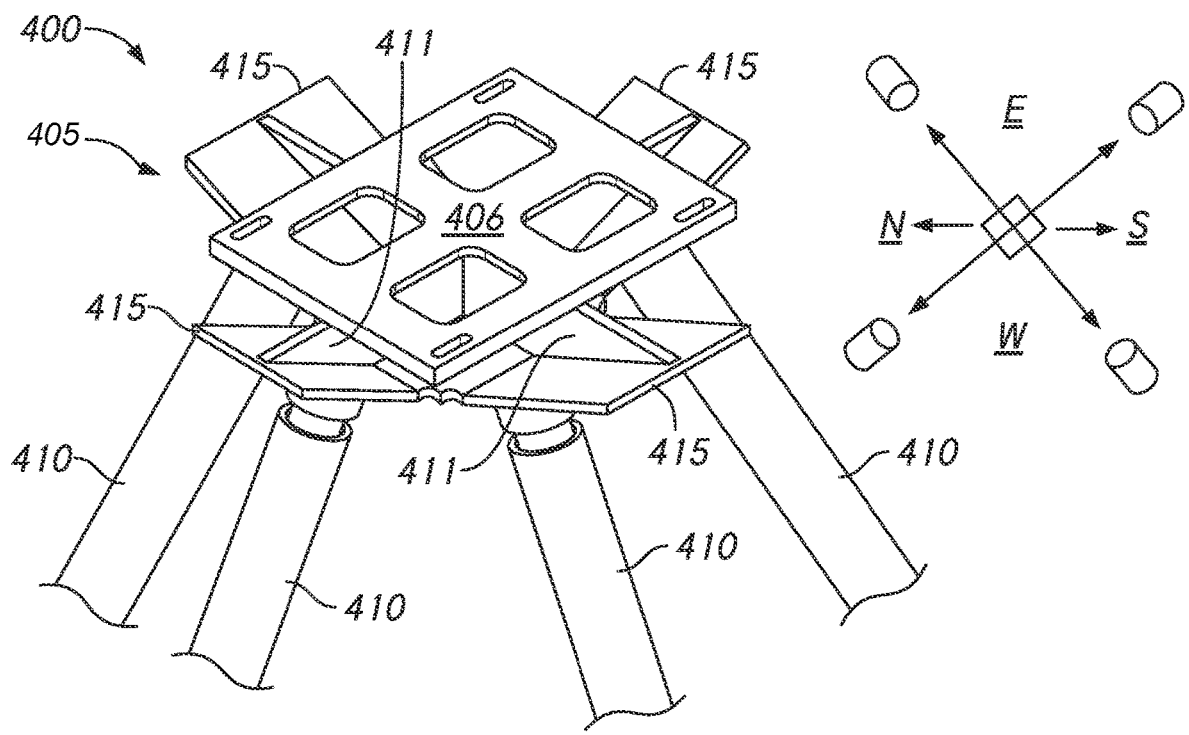
FIGS. 6A and B are two views of yet another double-truss foundation and adapter according to various exemplary embodiments of the invention.
Figure 6B:
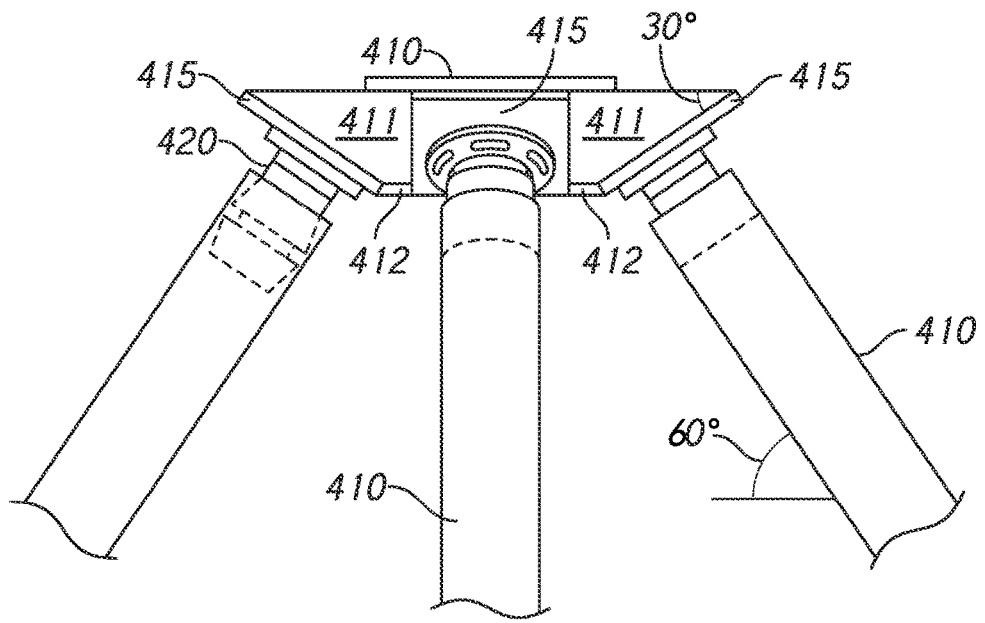

FIGS. 6A and B show yet another double-truss foundation system 400 for a torque tube drive motor or other axial load-bearing tracker component according to various other embodiments of the invention. System 400 utilizes four truss legs 410 arranged in a cross-shaped pattern on either side of the torque tube. Adapter 405 is a heavy-duty adapter constructed of top plate 406 and flanges 410. Flanges 410 are oriented symmetrically around top plate 406 and angled at the appropriate orientation to be orthogonal to respective legs 410. In principle, the geometry of adapter 405 Adapter 405 shown here is made of welded sections of steel plate. Orthogonal ribs 411 are welded to the bottom of plate 406. Bottom plate 412 is welded to the opposing edge of ribs 411 with four flange sections 415 bent upwards at the appropriate angle and supported by ribs 411. As shown, couplers 420 are attached to each flange 415. In various embodiments, upper legs 410 are joined to coupler 420 with a crimped connection that enables some degree of axial adjustment to achieve the desired orientation of top plate 406 in a manner similar to that discussed in the context of the embodiment shown in FIGS. 5A/B.

Figure 7A:
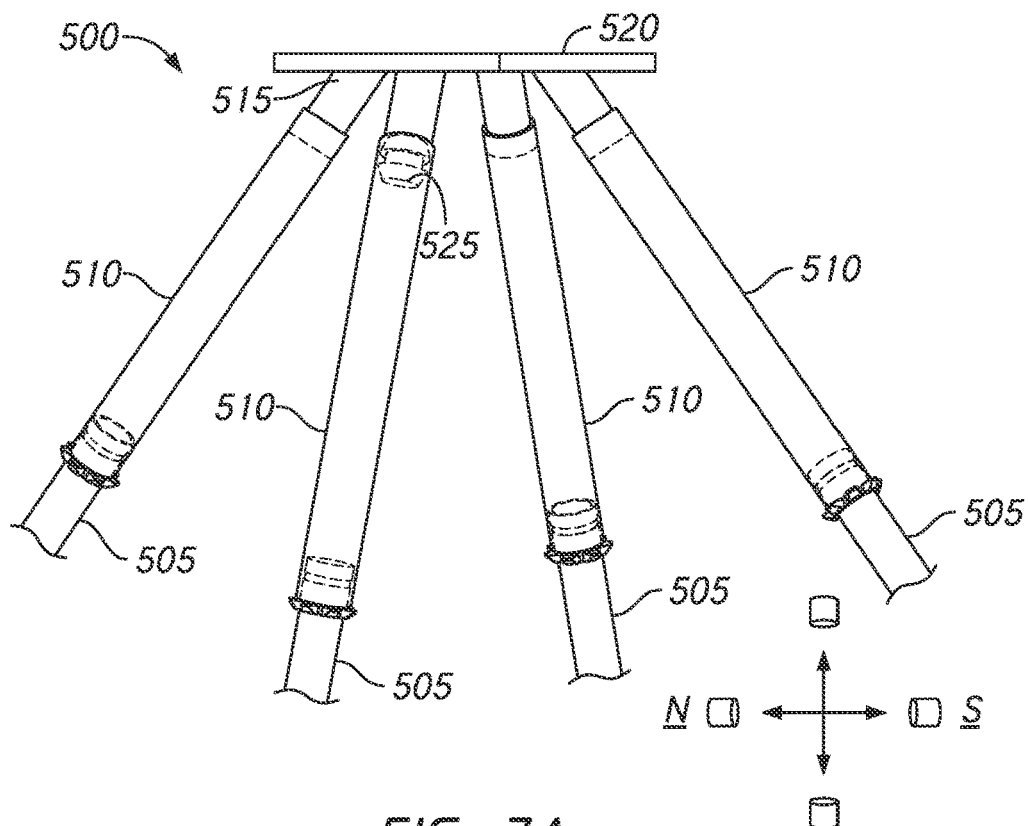
FIGS. 7A and B are two views of a further double-truss foundation and adapter according to various exemplary embodiments of the invention.
Figure 7B:
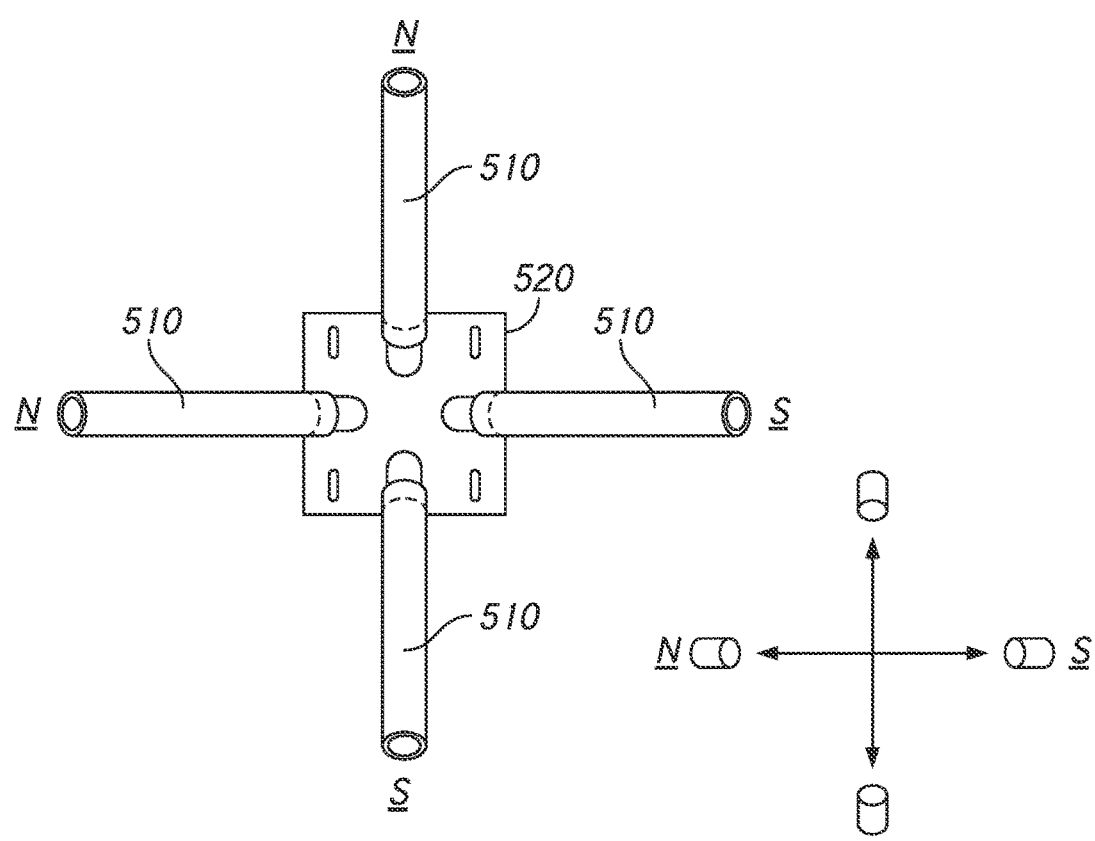
Figure 8A:
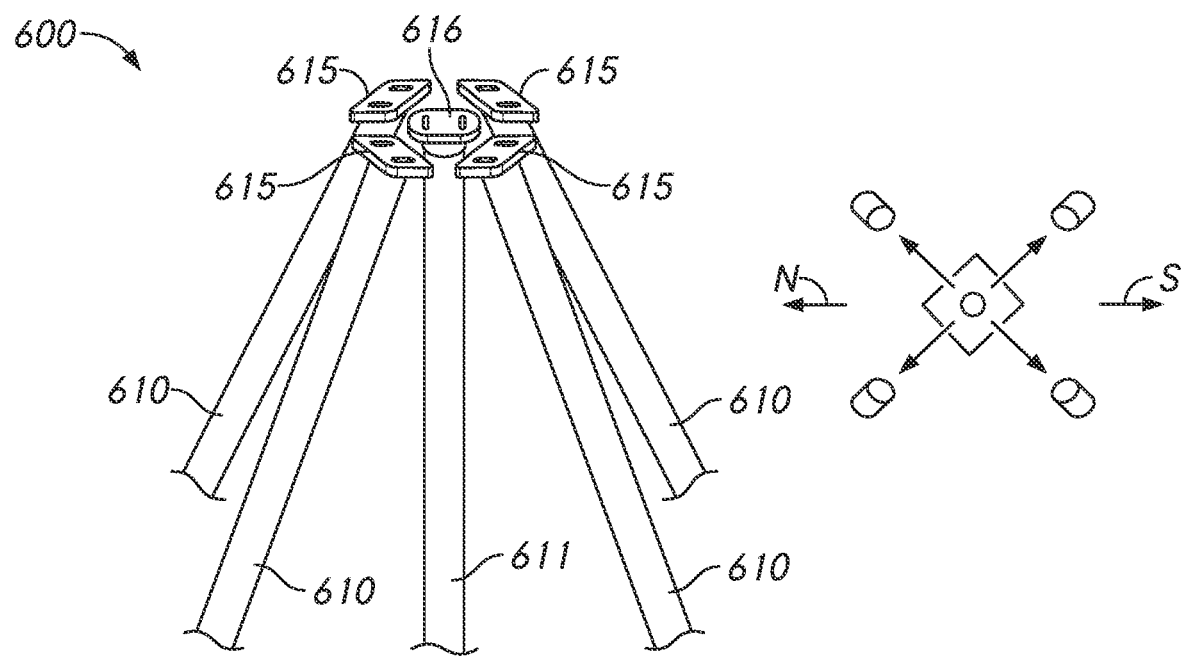
FIGS. 8A-D are various views of a five-legged truss according to various exemplary embodiments of the invention.
Figure 8B:
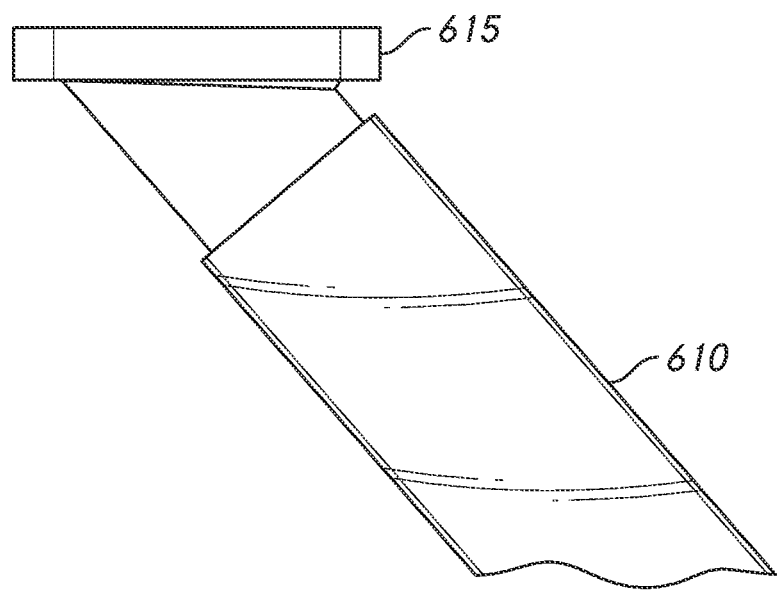
Figure 8C:
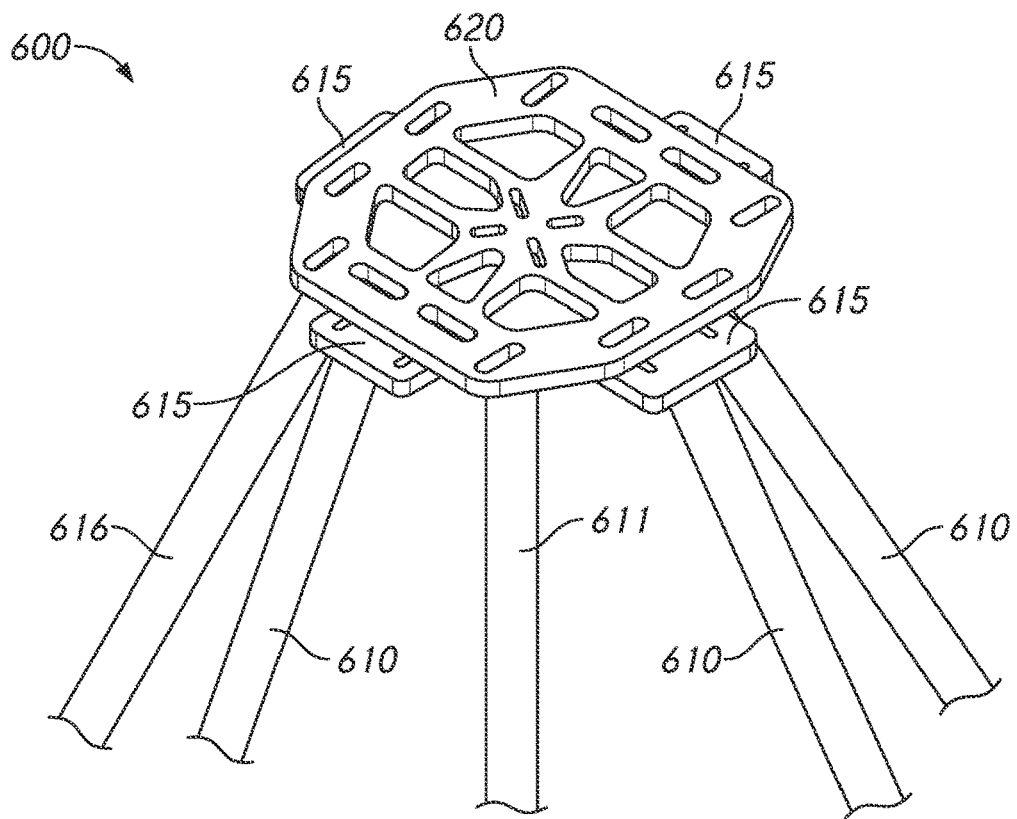
Figure 8D:
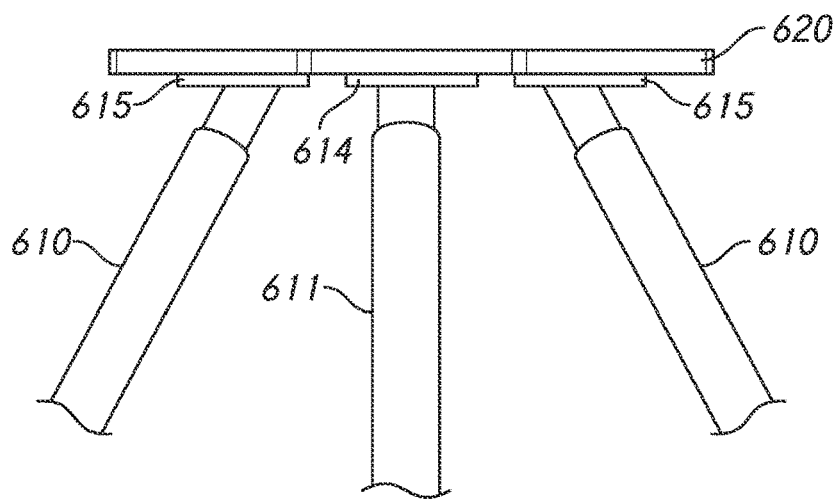

Turning now to FIGS. 7A and B, these figures show a further double-truss foundation system for a torque tube drive motor or other axial load-bearing tracker component according to further exemplary embodiments of the invention. System 500 according to these embodiments includes fewer parts and may be less complicated and expensive to manufacture than that of other embodiments. System 500 consists of substantially planar adapter 520 with four evenly distributed connecting portions 515 terminating in couplers 525. In various embodiments, connecting portions 515 are oriented so that two of legs 510 are at angles substantially under the torque tube (e.g. sloped along a North-South axis) and the other two are orthogonal to the torque tube (e.g., sloped along an East-West axis). Couplers 525 shown in the figure are crimp couplers, however, it should be appreciated that they may simply be tubes dimensioned to receive or fit within legs 510. Each leg 510 is joined to a respective base screw anchor 505 (not shown) in a manner like that discussed herein in the context of other embodiments. As shown, adapter 520 includes several mounting slots for attaching the drive motor and for allowing some East West and North South adjustment. It should be appreciated that these are exemplary only and that other slot and/or hole configurations are also possible.

Turning to FIGS. 8A-D, these figures show another double-truss foundation system 600 for supporting a torque tube drive motor or other axial load-bearing tracker component according to various embodiments of the invention. System 600 according to this embodiment consists of five truss legs joined together at adapter plate 620. Outer legs 610 are designed to fit at the corners of adapter plate 620 while center leg 611 is designed to be driven plumb, that is, directly under adapter plate 620. The difference between corner legs 610 and center leg 611 is that corner legs 610 have an angled support plate 615 attached to their head, seen in the detail of 8B, while center leg 611's support plate 616 is perpendicular to the shaft of its corresponding leg. In various embodiments, support plate 616 may have a different outline shape (e.g., oval rather than square) than plates 615 to enable it to be readily identified and separately inventoried and also to ensure fitment between the edges of plates 615. Although plates 615/616 are fixed to legs 610/611, it may speed up the installation process by requiring five fewer crimp joints. Compensation for misalignment may be achieved at the joint between the base anchors and legs 610/611.

As shown, adapter plate 620 is substantially planar and includes a plurality of different slots to provide flexibility in attaching to legs 610/611 to align the drive motor with the torque tube. Fifth leg 611 may only be necessary in unstructured soils, and therefore, is not necessary to support adapter 620. Installation of the exemplary system of FIGS. 8A-D may be accomplished by first installing the four angled base screw anchors and center plumb anchor into the underlying ground as shown in 8A. Then upper legs 610/611 can be attached to their respective base screw anchors before joining adapter plate 620 to plates 615/616 atop each leg. It should be appreciated that any of the embodiments shown in FIGS. 4A/B-7A/B could be easily modified to accommodate a fifth leg as necessary.

Figure 9A:
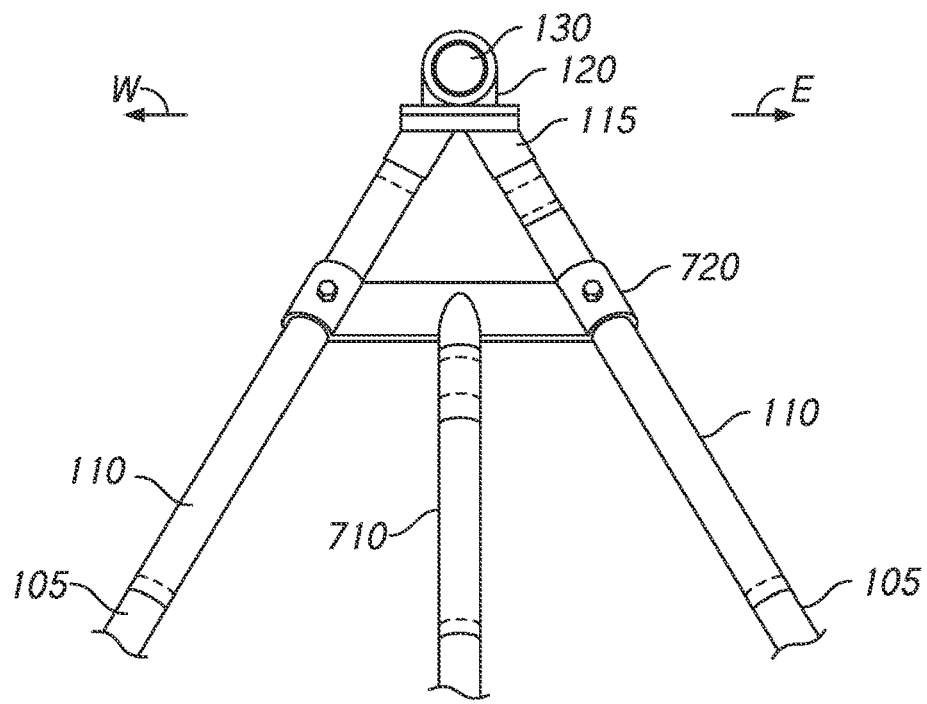
FIGS. 9A and B are two views of a three-member truss according to various exemplary embodiments of the invention.
Figure 9B:
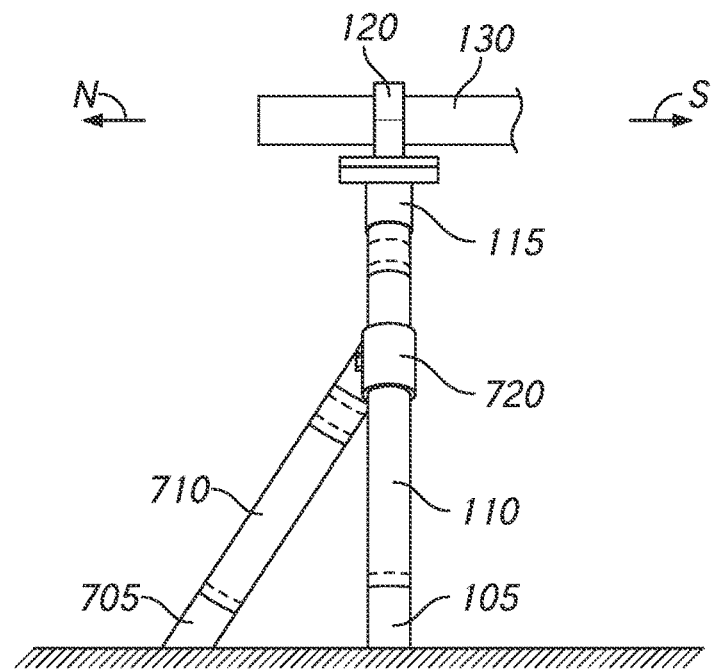

Turning to FIGS. 9A and B, these figures show a single-truss, such as that shown in FIGS. 1A-C, that has been modified to include an additional structural member to provide weak-axis support in the direction of the torque tube. Such a single-truss may be used to support a torque tube drive motor, bearing assemblies such as bearing 120, or other axial load-bearing tracker components. The exemplary single-axis tracker shown in these figures is a conventional bottom-up style tracker where the bearing sits atop the A-frame and the torque tube is captured within the bearing to rotate about its own central axis. The free end of each above-ground foundation leg 110 is joined axially to a bearing support to complete the A-frame. This system achieves weak-axis support for the entire tracker with third leg 710 that is leaning towards the plane defined by legs 110, substantially under torque tube 130. This design may be useful for tracker systems that translate axial loads into each foundation. Alternatively, it could be used for the truss supporting the drive motor.

The system shown here takes modifies the single truss with third-leg 710 and third-leg support bracket 720. In various embodiments, support bracket 720 is attached to upper legs 110 after the A-frame is assembled to provide weak-axis support. The installation of this foundation system may be identical to that for other embodiments. After upper legs 110 are attached and joined with adapter 115, and the bearing assembly 120 or drive motor (not shown) are attached, third-leg support bracket 720 can be attached to the legs. In various embodiments, base screw anchor 705 will be driven at the same time as screw anchors 105 so that there is no interference from the truss. Upper leg 710 will connect base screw anchor 705 to third-leg support bracket 720. With this design, the single-trusses ability to withstand lateral loads is not compromised yet the presence of third leg 710 allows axial forces to be at least partially translated into tension and compression rather than putting truss legs 110 solely into bending.

Figure 10A:
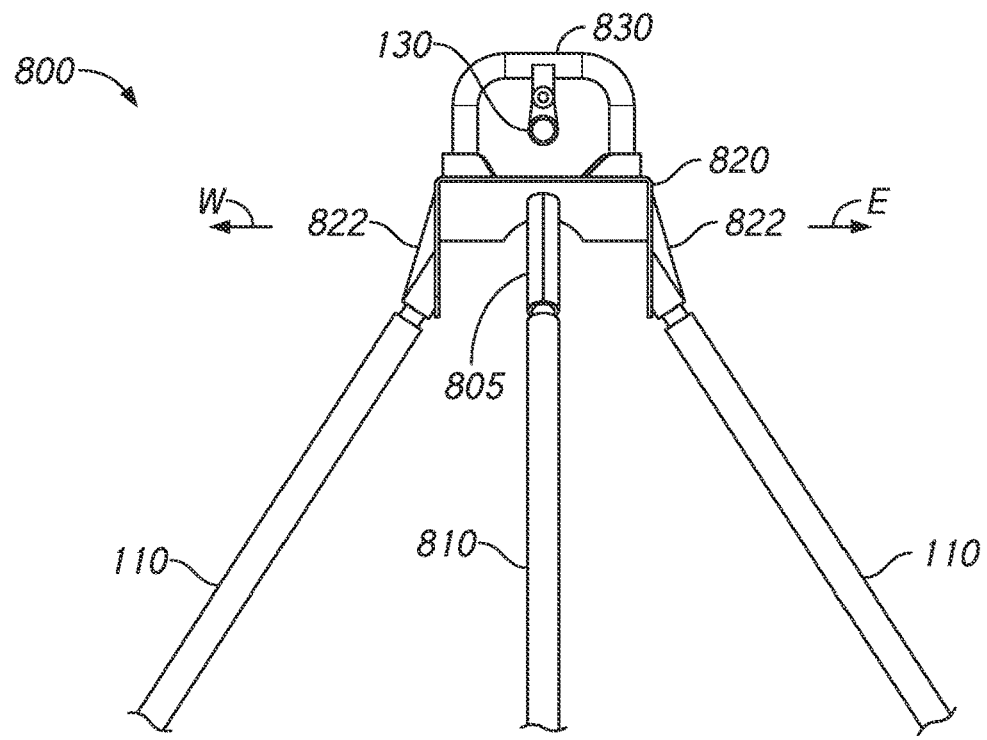
FIGS. 10A and B are two views of another three-member truss according to various exemplary embodiments of the invention.
Figure 10B:
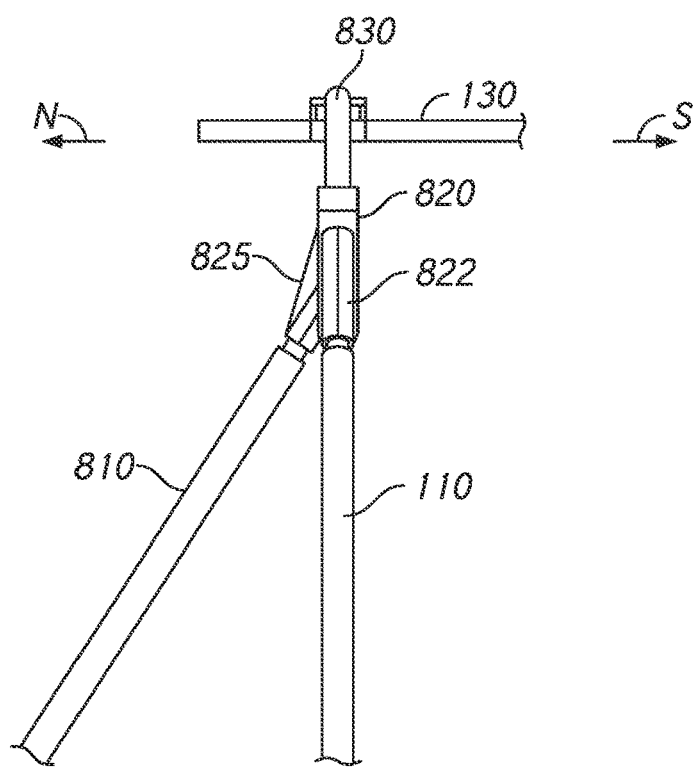

FIGS. 10A and B, figures show end and side views respectively of another truss truss system 800 for supporting a torque tube drive motor or other with weak-axis support according to various other embodiments of the invention. The tracker shown here is a top-down design where the torque tube hangs from a bearing pin in a central bearing built into bearing assembly 830. Rather than joining the free ends of each above-ground leg, bearing assembly 830 in this example has two feet that sit on top of adapter 820. Adapter 820 has a flat mounting surface, with side connecting portions 822 and third-leg connecting portion 825. Each connecting portion 822/825 projects down and away from the flat mounting surface to match the angle of the corresponding truss legs 110/810. In various embodiments, third leg connecting portion 825 is orthogonal to the other two connecting portions 822 from the perspective of the torque tube (i.e., overhead) and is used to join the truss to third leg 810. This third leg may be connected to a third base screw anchor (not pictured) as described herein. This system of FIGS. 10A/B may be advantageous relative to that shown in other embodiments because the legs are all approximately the same length, allowing the same truss leg components to be used for East-West as well as weak-axis support. Also, because third leg is also oriented to point at the rotational axis of the tracker, it may more efficiently translate axial forces the torque tube into tension and compression.

Figure 11A:
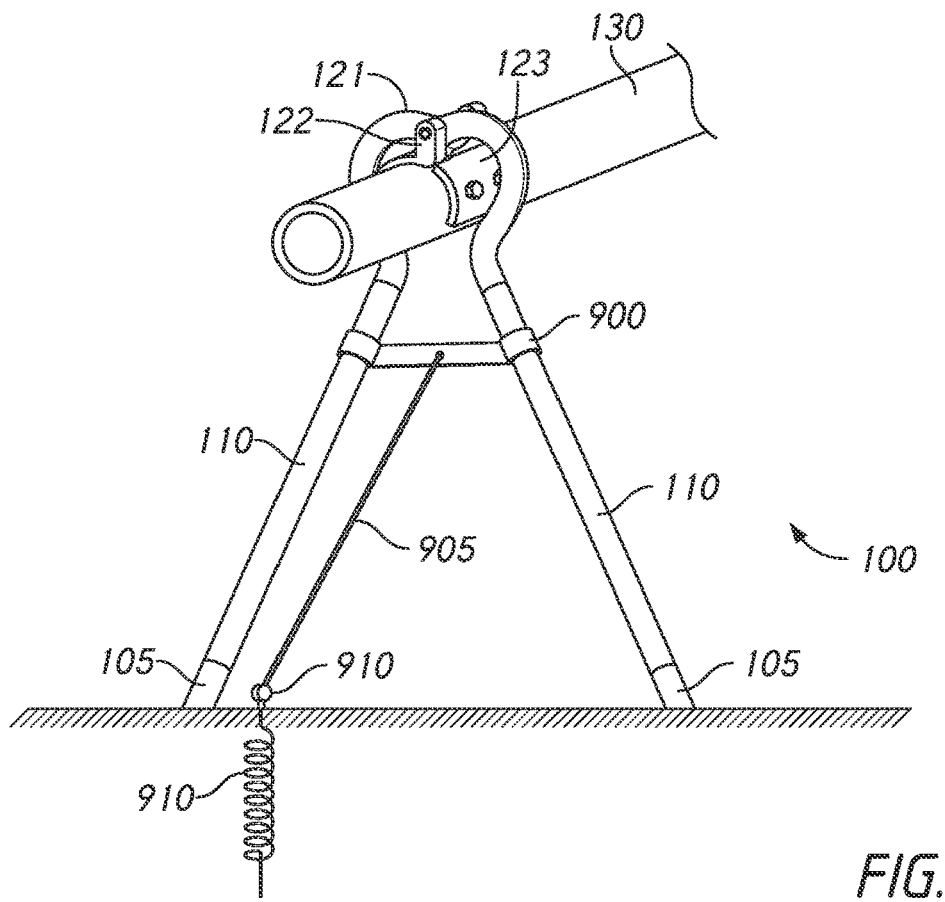
FIGS. 11A and B are two views of a single-truss and tensioned cable according to various exemplary embodiments of the invention.
Figure 11B:
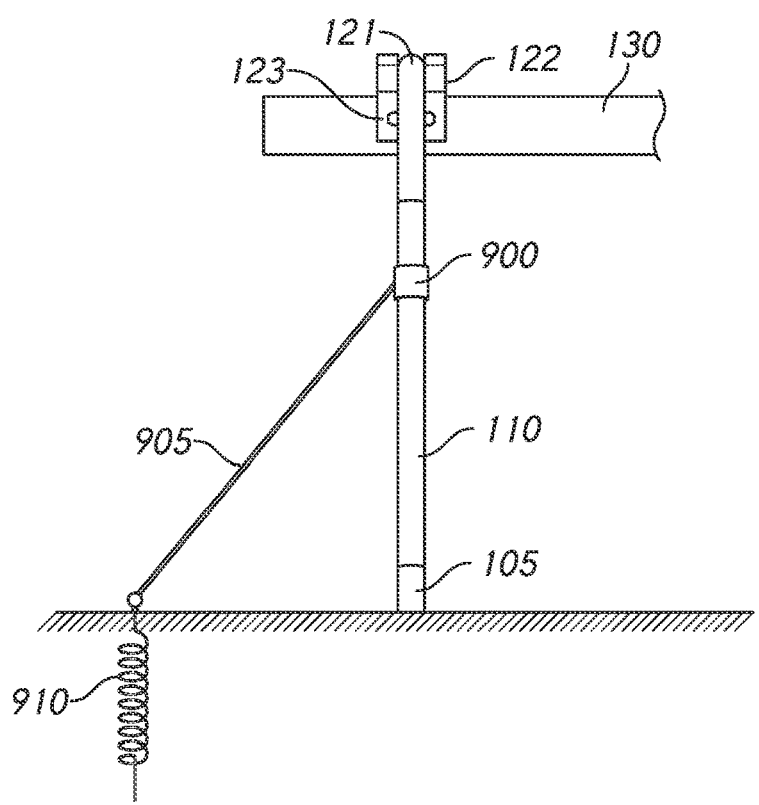

Turning now to FIGS. 11A and B, these figures are perspective and side views respectively of a single truss foundation for a single-axis tracker that provides weak axis support according to various exemplary embodiments. The portion of the tracker shown in this figure consists of one single-truss foundation 100 and bearing housing assembly 121 supporting one end of torque tube 130. Torque tube 130 is oriented along a North-South axis while legs 110 of the single truss are arranged orthogonally on either side of the torque tube in a substantially East-West plane. As discussed above, a truss configured in this manner can translate lateral loads into the truss legs as axial forces of tension and compression but is unable to do that with forces oriented along the axis of the torque tube. In order to resist such axial forces, in this exemplary embodiment, cable 905 has been tensioned from member 900 joining truss legs 110 to ground anchor 910. Cable 905 may be tensioned with a turnbuckle or other suitable tensioning device. Also, instead of ground anchor 910, a base screw anchor, such as that shown making up the legs of various trusses shown herein may be used instead. This may eliminate the need for an additional SKU for a limited use part. Because a tensioned cable can only resist tension and not compression, a second tensioned cable must be attached to the same or a different single-truss in the same row that extends in the opposite direction to resist axial forces in the opposite direction. The combination of the two tensioned cables will resist North or South-oriented axial forces to protect the various truss foundations along the torque tube from bending.

The single-axis tracker shown in FIGS. 11A/B is a mechanically balanced or top-down design where the torque tube hangs from an axis of rotation—in this case, bearing pin 122—and swings through an arc as the offset drive motor imparts torque to the tube. It should be appreciated that the various inventive aspects of this and other embodiments are equally applicable to conventional bottom-up systems where the torque tube is supported within a bearing sitting on top of the A-frame that rotates about its own axis as long as the torque tube is prevented from sliding axially through the bearing.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A single-axis tracker comprising:
a torque tube;
a plurality of solar panels attached to the torque tube;
a plurality of first truss foundations rotatably supporting the torque tube, each first truss foundation comprising a pair of legs driven into an underlying ground on opposing East and West sides of the torque tube and joined together above the underlying ground with a first adapter to be perpendicular to the torque tube;
a bearing assembly, attached to each first truss foundation, the bearing assembly rotatably supporting the torque tube;
at least one second truss foundation comprising two pairs of legs extending above and below the underlying ground and joined together above the underlying ground with at least one second adapter, each pair of the two pairs of legs symmetric about the torque tube with at least two of the legs of the two pairs of legs of the at least one second truss foundation oriented non-perpendicularly to the torque tube to form a double truss foundation; and
a torque tube drive motor attached to the at least one second truss foundation.

2. A single-axis tracker comprising:
an elongated torque tube extending lengthwise in a first direction;
a plurality of solar panels coupled to the torque tube;
a plurality of first truss foundations rotatably supporting the elongated torque tube, each of the plurality of first truss foundations comprising a pair of legs driven into an underlying ground on opposing sides of the elongated torque tube and joined above the underlying ground with an adapter to form a first A-frame with the ground, wherein the first A-frame defines a pair of parallel planes that are substantially orthogonal to the first direction; and
at least one second truss foundation, the at least one second truss foundation comprising two adjacent pairs of legs extending above and below the underlying ground and arranged symmetrically about the torque tube to form a pair of second A-frames with the underlying ground, wherein each of the pair of second A-frames defines a pair of parallel planes that are non-orthogonal to the first direction-.

3. The single-axis tracker according to claim 2, further comprising a plurality of bearing assemblies, each bearing assembly supported by one of the adapters of the plurality of first truss foundations and providing a bearing surface for receiving a rotating member that forms a rotational axis of the tracker.

4. The single-axis tracker according to claim 3, wherein the rotating member is a bearing pin from which the elongated torque tube is suspended.

5. The single-axis tracker according to claim 3, wherein the rotating member is the elongated torque tube.

6. The single-axis tracker according to claim 2, wherein the at least one second truss foundation supports a torque tube drive motor.

7. A single-axis tracker comprising:
a torque tube;
a plurality of single-truss foundations each single-truss foundation comprising a pair truss legs extending below and above an underlying ground and joined together above the underlying ground with a first adapter to symmetric about the torque tube and to form an A-frame shaped truss with the underlying ground that is substantially perpendicular to a rotational axis of the tracker;
a bearing assembly attached to each first truss foundation, each bearing assembly rotatably supporting the rotational axis of the tracker;
at least one double-truss foundation comprising four truss legs extending below and above the underlying ground and joined together above the underlying ground by at least one second adapter, wherein at least two of the four legs of the at least one double-truss foundation are oriented non-perpendicularly to the rotational axis of the tracker; and
a torque tube drive motor attached to the at least one double-truss foundation.

\* \* \* \* \*